UNITED STATES PATENT OFFICE.

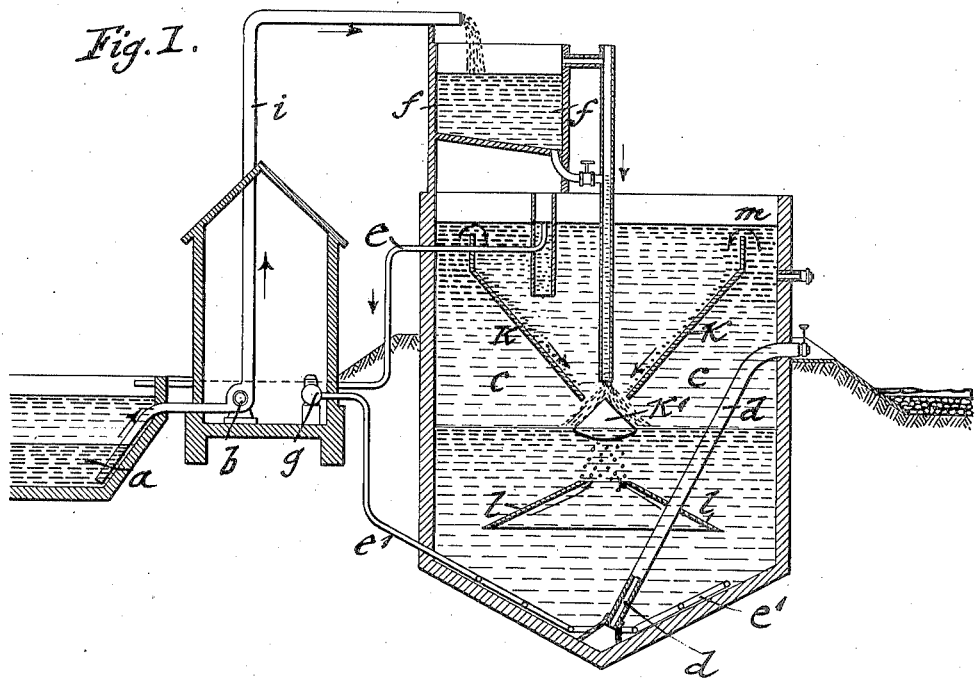
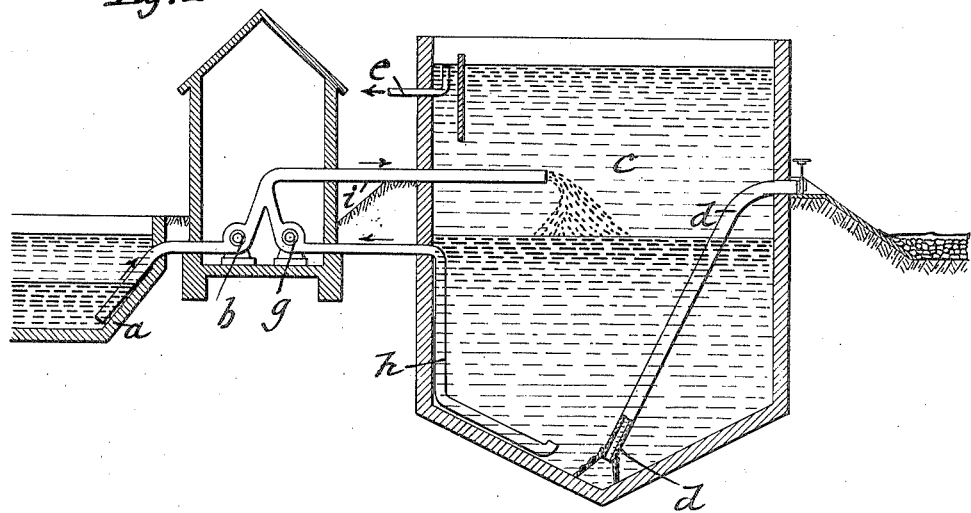

KARL IMHOFF AND HEINRICH BLUNK, OF ESSEN-ON-THE-RUHR, GERMANY.

PROCESS OF TREATING SLUDGE.

1,399,561. Specification of Letters Patent. Patented Dec. 6, 1921.

Application filed April 19, 1913. Serial No. 762,260.

(GRANTED UNDER THE PROVISIONS OF THE ACT OF MARCH 3, 1921, 41 STAT. L., 1313.)

*To all whom it may concern:*

Be it known that we, KARL IMHOFF and HEINRICH BLUNK, citizens of the German Empire, residing in Essen-on-the-Ruhr, in said German Empire, have invented certain new and useful Improvements in Processes of Treating Sludge, (for which we have obtained patent in Germany, No. 275,498, June 17, 1914,) of which the following is a specification.

The invention relates to an improved process for treating sludge and rendering it odorless for further disposition.

When sewage material such as putrescible sludge, which usually has a high moisture content, or municipal sewage, which is also included under the term, "sewage material," is allowed to remain for some time in a container, various kinds of decomposition are taking place. The two most important classes of decomposition which take place may be termed "putrid decomposition," which is characterized by the evolution of hydrogen sulfid and other bad-smelling gases, and "odorless decomposition," in which practically only odorless gases (mainly marsh gas and carbon dioxid) are evolved.

Odorless decomposition possesses many advantages compared with putrid decomposition. Bad-smelling odors are avoided near the sludge-containers and the sludge drying beds, and the sludge attains more rapidly a consistency favorable to drying and subsequent handling.

The object of the present invention is to suppress, by means of suitable processes, as far as possible the occurrence of putrid decomposition, and to so promote the biological changes of odorless decomposition as to obtain properly decomposed sludge in the shortest possible time and in the smallest space.

To a certain extent, and under certain conditions, it is possible to obtain in the so-called Imhoff-tanks (a combination of sedimentation-and-decomposition chambers) a fairly odorless and a fairly rapid decomposition. All attempts have been in vain, however, to attain this rapid and odorless decomposition in ordinary sludge-containers of any kind, when charged with sludge in the usual manner. The reason for this is that it has been neglected to promote odorless decomposition, which begins to take place in deposited sludge after a certain time, to a sufficient extent by the addition of food in the form of fresh sludge. Another reason is that it has been neglected to permeate the fresh sludge sufficiently early with the exciters of odorless decomposition, so as to prevent the occurrence of putrid decomposition.

Both errors may be avoided when in a ripened decomposition-chamber a continuous and intimate contact between fresh and decomposed sludge is secured. All of the following processes have this object as their aim. These processes render a rapid odorless decomposition possible in ordinary sludge-containers. They have the property also, however, of accelerating decomposition in the Imhoff-tanks.

It will be evident that the pumping of fresh sludge into one side of a decomposition-chamber, which is the usual method, would militate against this fundamental principle. In this manner a pile of fresh sludge remains which would develop decomposition processes within itself, and upon which the "exciters" of odorless decomposition, which may be performing their work satisfactorily in other parts of the tank, can have no influence.

A marked improvement, however, is obtained if fresh sludge is conveyed simultaneously or successively to many points in the decomposition-chamber. Fixed or movable distribution-apparatus suited to this purpose is known.

In the accompanying drawings,

Figure 1 represents a vertical longitudinal section of an apparatus for treating sludge according to our improved process, and Fig. 2 is a similar section of a modified construction of the same.

Similar letters of reference indicate corresponding parts in the figures of the drawings.

Referring to Fig. 1, *a* represents a settling chamber from whose floor sludge is removed from time to time by means of a pump *b* into a sludge-container $c$. After being sufficiently decomposed, the sludge is discharged through the pipe $d$. The pipe-line $e$ keeps the level of water in the sludge-container constant, this being advisable as a rule. This water may either be led back to the settling chamber through the pipe $e$ or disposed of in any other manner. The effect of this sludge-container may be improved in accordance with the above outlined intention by bringing fresh and decomposed sludge into intimate contact, not by pumping the sludge into the tank in large amounts and at long intervals, but supplying it to the sludge-container at a uniform rate adapted to the decomposition-process. For this purpose an equalizing chamber $f$, connected with pump $b$ by a pipe $i$ with an adjustable discharge-apparatus may be located above the sludge-container. Compressed air may be forced in through the pipe $e'$, having perforations in its sides by the pump $g$, to agitate the sludge.

In order to insure from the outset the intimate mixture of the fresh and decomposing sludge, the fresh sludge may be conveyed to the sludge-chamber in the same pipe with a stream of decomposing sludge. This may, for example, be accomplished in the manner shown in Fig. 2. While pump $b$ is pumping fresh sludge into the sludge-chamber, a second pump $g$ is simultaneously lifting decomposed sludge through the pipe $h$ and pumping it uniformly with the fresh sludge through said pipe into the sludge-chamber. The pipe $i'$ through which the fresh sewage material and the decomposed sewage material is pumped into the container, is above the level of the sludge, which has been precipitated or settled from the liquid. An overflow pipe $e$ performs the same function as in the embodiment shown in Fig. 1. In this manner an intimate and uniform mixture of both kinds of sludges is obtained.

In the sludge-chamber itself the intimate contact of fresh and decomposed sludge may be facilitated by simple devices. A large part of the sludge in the sludge-chamber is kept in a continuous vertical motion during decomposition by the rising gas-bubbles. The inclined walls $k$ (Fig. 1) lead the sinking sludge to any place where the mixture may be desired, for example to the place where the fresh sludge is introduced, near the triangular deflector $k^1$ located at the lower end of the walls $k$.

Below the deflector $k^1$ are inclined walls $l$, which have an opening at their upper end for gathering the rising gas-bubbles and leading them to places where their stirring action may be most effective.

The upward motion of the gases causes in a short time the formation of a layer of floating sludge which under certain conditions would continually increase in thickness. Such sludge-particles as are entrained in this floating sludge, if they are not yet sufficiently decomposed, are no longer surrounded by as favorable conditions for decomposition as the other particles of decomposing sludge. The promotion of odorless decomposition makes it desirable that the floating sludge be caused to sink and distribute itself as soon as possible. For this purpose the walls $k$ are of advantage as they lead the rising gas-bubbles away from the greater portion of the floating sludge and conduct them to isolated places where they may easily emerge. The floating sludge is thereby freed from the upward impulse of the continually rising gas-bubbles, the entrained gas soon escapes, and the floating sludge sinks.

We claim:

1. The process herein described of decomposing sludge, which consists in bringing decomposing sludge into intimate contact with fresh sludge.

2. The process herein described of decomposing sludge, which consists in bringing decomposing sludge simultaneously or successively into intimate contact with quantities of fresh sludge.

3. The process herein described of decomposing sludge, which consists in conveying fresh sludge in a continuous stream into intimate contact and admixture with decomposing sludge.

4. The process herein described of decomposing sludge, which consists in conveying frseh sludge into decomposing sludge and intimately mixing the two kinds of sludge for producing odorless sludge.

5. The process herein described of decomposing sludge, which consists in conveying a stream of decomposing sludge which is fed simultaneously with fresh sludge and intimately intermingled therewith.

6. The process herein described of decomposing sewage material which consists in bringing decomposing sewage material into intimate contact with fresh sewage material.

7. The process herein described of decomposing sludge which consists in bringing decomposing sludge into intimate contact with fresh sewage material.

8. The process herein described of decomposing sewage material which consists in conveying a stream of decomposing sewage material which is fed simultaneously with fresh sewage material and intimately intermingled therewith.

9. The process herein described of decomposing sludge which consists in conveying a stream of decomposing sludge which is fed simultaneously with fresh sewage material and intimately intermingled therewith.

10. The process herein described of decomposing sewage material which consists in conveying fresh sewage material in a continuous stream into intimate contact and admixture with decomposing sewage material.

11. The process herein described of decomposing sludge which consists in conveying fresh sewage material in a continuous stream into intimate contact and admixture with decomposing sludge.

In testimony, that we claim the foregoing as our invention, we have signed our names in presence of two subscribing witnesses.

KARL IMHOFF. [L. S.]
  HEINRICH BLUNK. [L. S.]

Witnesses:
 HELEN NUFER,
 JULIUS FESTNER.